United States Patent
Reiner et al.

(10) Patent No.: US 9,579,689 B2
(45) Date of Patent: Feb. 28, 2017

(54) METHOD FOR COATING A SHAPED COMPONENT

(71) Applicant: GXC COATINGS GMBH, Goslar (DE)

(72) Inventors: Thomas Reiner, Goslar (DE); Torsten Schmidt, Goslar (DE); Florian W. Haacke, Goslar (DE)

(73) Assignee: GXC Coatings GmbH, Goslar (DE)

( * ) Notice: Subject to any disclaimer, the term of this patent is extended or adjusted under 35 U.S.C. 154(b) by 0 days.

(21) Appl. No.: 14/905,839

(22) PCT Filed: Jan. 16, 2014

(86) PCT No.: PCT/DE2014/000012
§ 371 (c)(1),
(2) Date: Jan. 18, 2016

(87) PCT Pub. No.: WO2015/014331
PCT Pub. Date: Feb. 5, 2015

(65) Prior Publication Data
US 2016/0151804 A1    Jun. 2, 2016

(30) Foreign Application Priority Data

Jul. 31, 2013   (DE) .................. 10 2013 012 706

(51) Int. Cl.
*B05D 7/22* (2006.01)
*B05D 1/02* (2006.01)
(Continued)

(52) U.S. Cl.
CPC .............. *B05D 7/22* (2013.01); *B05D 1/02* (2013.01); *B05D 7/54* (2013.01); *B29C 37/0025* (2013.01);
(Continued)

(58) Field of Classification Search
None
See application file for complete search history.

(56) References Cited

U.S. PATENT DOCUMENTS

| 4,455,964 A | 6/1984 | Weber |
| 5,492,750 A | 2/1996 | Shumaker et al. |
| 6,017,581 A | 1/2000 | Hooker et al. |

FOREIGN PATENT DOCUMENTS

| EP | 1448719 A1 | 8/2004 |
| GB | 2 351 682 A | 1/2001 |
| WO | 2011/047727 A1 | 4/2011 |

*Primary Examiner* — Nathan T Leong
(74) *Attorney, Agent, or Firm* — Whitham, Curtis & Cook, P.C.

(57) ABSTRACT

The invention relates to a method for coating a shaped component (3) having an inner side (12) and an outer side (9) with a first coating material on the inner side (12) and with a second coating material on the outer side (9), wherein a strip (13) at least of the outer side (9) remains uncoated in the region of a circumferential edge (6) that adjoins the inner side (12) and the outer side (9), and the first and second coating materials cannot be mixed with each other, in which method the component (3) is introduced into a holder and held fixed in its position there while the coating materials are applied one after the other by means of a spraying robot. The method is simplified and allows a reduction in the number of handling steps in that a plate (1) is used as the holder, said plate having a recess (2) with profiling (4, 5) formed above the height thereof, into which the component (3) is placed without the use of a movable fastening means, and the recess (2) is sealed off in such a manner that the first coating material that is sprayed from a first side (7) of the plate (1) does not reach the outer side (9) of the component and the second coating material that is sprayed from the second side (8) of the plate (1) does not reach the inner side (12) of the component (3). The method is further characterized in that any overspray is extracted from the respective side and in (Continued)

that the second coating material is sprayed in such a manner that the strip (13) of the component (3) always lies in a spray shadow formed by the profiling (4, 5).

7 Claims, 4 Drawing Sheets

(51) Int. Cl.
    *B05D 7/00*          (2006.01)
    *B29C 37/00*        (2006.01)
    *B05B 15/12*        (2006.01)
    *B29L 9/00*         (2006.01)
(52) U.S. Cl.
    CPC ....... *B05B 15/1203* (2013.01); *B05B 15/1225* (2013.01); *B05D 2252/02* (2013.01); *B29L 2009/005* (2013.01)

METHOD FOR COATING A SHAPED COMPONENT

The invention relates to a method for coating a molded component comprising an interior and an exterior with a first coating material on the interior and with a second coating material on the exterior, a strip at least of the exterior remaining uncoated in the region of a peripheral edge adjoining the interior and the exterior and the first and the second coating materials not being miscible with one another, in which method the component is introduced into a holder and is there held fixed in position while the coating materials are applied in succession by means of a spray robot.

For numerous components it is desirable or indeed necessary to coat the interior with a first coating material and the exterior with a second coating material different from the first coating material. A preferred instance is the coating of a component used as an optical component, such as for example a transparent covering cap for an automotive light. Typical automotive lights of this type are headlights, including fog lights, indicator lights, brake lights and rear fog lights. The same problems arise with other optical devices, such as for example cameras, which for example make the space behind the vehicle visible to the driver during reversing. The optical component of the camera is in this case the lens, which provides wide-angle images.

Such components, as used on motor vehicles, must have a scratch-resistant exterior. They are therefore regularly provided on the exterior with a scratch-resistant coating, in particular if the molded component consists of a plastics material and is produced for example by injection molding.

The optical component in question is often connected in a sealed manner with a corresponding device, for example a luminaire or a camera. A welded joint is suitable for this purpose in the case of components of plastics materials. Nevertheless, it is impossible to prevent moisture from penetrating into the interior of the component and therefore condensing on the component if the latter is at a significantly lower temperature.

With light sources that generate large amounts of heat, the interior was hitherto heated up to such a degree that even the covering component became warm, so eliminating again any condensation. Due to the use of energy-saving light sources also in motor vehicles, for example the use of light-emitting diodes, this effect no longer occurs, such that other measures had to be taken against condensation on the interior of the component.

It is therefore known to ventilate the interior of a luminaire or other optical unit with a fan, such that the air is circulated and the tendency towards condensation is thereby reduced.

It is furthermore known to provide the interior with an anti-fog coating, as described for example in EP 1 448 719 B1. The anti-fog coating brings about lasting hydrophilization of the inner surface of the component and consists for example of sinterable nanoscale particles of inorganic structures with hydrophilic side chains and optionally organic side chains with functional groups.

In the conventional mode of production, the corresponding components are provided on the exterior with a second coating, for example a scratch-resistant coating, washed once they have been cured and prepared for further processing in a clean room. In the clean room, the interior is then coated, for example using a spray robot to spray on the first coating material for the first coating, on the interior. The coating is then thermally cured, whereby the component is then finished.

It has already been proposed to apply the second coating on the exterior and the first coating on the interior in succession in a clean room and to subject both coatings jointly to thermal curing in order to cut the number of method steps. A prerequisite for this, however, is that the component is inserted between two parts of a holder in such a way that the first coating material does not reach the exterior and the second coating material does not reach the interior of the component, a strip at the edge of the component being kept free of any coating material at least on the exterior. Accordingly, a holder part grips over the strip on the exterior and is connected in a clamped manner with a second holder part, which supports the edge of the component, such that the component is situated in a sandwich holder and is partly masked by the holder with regard to the coating materials.

Fastening the component in such a sandwich holder requires careful insertion of the component and good metering of the clamping process, so the component is not destroyed by the clamping process. The streamlining of the process by joint curing of the two coatings is therefore partly canceled out by the working time needed for an operator to align the component carefully in the holder.

The object of the present invention is therefore to simplify the method for applying the coatings such that streamlining is achieved owing to a handling time no longer being required.

To achieve this object, the method of the above-mentioned type is characterized according to the invention in that a plate is used as the holder which comprises a recess with profiling formed over the height thereof, into which the component is inserted without the use of a mobile fastening means and thereby seals the recess in such a way that the first coating material sprayed on from a first side of the plate does not reach the exterior of the component and the second coating material sprayed on from the second side of the plate does not reach the interior of the component, that any overspray from the respective side is extracted and that spraying on of the second coating material proceeds in such a way that the strip of the component is always located in a spray shadow formed by the profiling.

The method according to the invention thus provides the use of a single plate as a holder, such that the component is merely laid with its edge onto the profiling adapted to the edge of the component and is held on the holder merely by its own weight. No fastening means mobile relative to the receiving plate with which the component would be positioned and/or clamped is therefore necessary for holding the component. Accordingly, any handling for the purposes of adjustment and fastening of the component in the holder is dispensed with. Nevertheless, coating of the exterior from the one side of the plate and of the interior from the other side of the plate is enabled in such a way that overspray could not reach the respective other side of the plate, and thus the undesired top of the component. Instead, any overspray is kept on the respective side of the plate and extracted by a powerful fan, as is standard practice for maintaining clean room conditions. Positioning of the component may be undertaken by machine, for example with the robot arm also used for spraying. Extraction from one side of the plate is preferably supplemented by the supply of purging air to the other side of the plate, such that a constant air flow is formed from the one side of the plate towards the other side of the plate around the holder, said air flow ensuring that any foreign particles, including spray particles, are conveyed away.

The strip not provided with a coating is formed at least on the exterior of the component in that the profiling of the plate makes it possible always to keep the strip in the spray shadow during spraying on of the coating material on the exterior. Thus, no masking of the component by direct covering by two holder parts movable towards one another is needed but nevertheless the correct and defined formation of an uncoated strip in the region of the edge of the component is possible.

Application of the two coating materials preferably proceeds with a single spray arm of the spray robot, which comprises two lines and spray nozzles with which the first coating material and the second coating material are applied.

Preferably, the plate forming the holder is oriented substantially horizontally, wherein the first coating material is sprayed onto the component from the bottom as the first side of the plate and the second coating material is sprayed onto the component from the top as the second side of the plate. Accordingly, the component is positioned into the holder by placing the edge of the component onto the profiling of the plate, wherein curvature of the component extends in the region of the second side of the plate, i.e. upwards. The component is fixed on the holder by the weight of the component, optionally supplemented by gentle clamping of the lower edge of the component in the profiling of the holder.

It would alternatively be possible to turn the component by 180°, such that the curvature extends downwards, and to suspend the component in the profiling of the plate with a flange, which then forms the uncoated strip on the exterior.

The component is preferably optically transparent and coating materials suitable for forming optically transparent coatings are used. Such coating materials are preferably coating materials with nanoscale solid particles.

Coating the component in accordance with the invention with different coating materials on an interior and an exterior also makes sense for components which are transparent to radiation other than visible radiation, wherein the coating materials are then also selected such that the coatings are transparent to the corresponding radiation from a source covered by the component. The component may then be suitable as a cover for infrared radiation, microwave radiation or the like.

The component coated according to the invention may in principle consist of glass, but is preferably produced from an injection-moldable or castable plastics material, which may be used as an optical component. These include in particular polycarbonates, polystyrenes, polymethyl acrylates, cycloolefin polymers and copolymers, polyaryl sulfones and silicones.

The preferred field of use is the application of an anti-fog coating on the interior and a scratch-resistant coating on the exterior of the component. The materials usable therefor are conventional commercial materials and are known to a person skilled in the art. The materials used are preferably those which can be cured in a controlled manner, wherein the two coatings are preferably curable with the same mechanism. Possible options in this respect are in particular thermal curing in a tunnel oven or curing using radiation, for example UV curing.

It goes without saying that the method according to the invention may also be used to apply all other coatings serving other purposes. These include antireflective coatings, polarization coatings, interference coatings etc.

The component coated according to the invention is used for optical devices and instruments, in particular for lighting devices and preferably as a cover for a vehicle light, for example with light-emitting diodes as light source.

The invention will be explained in greater detail below with reference to an exemplary embodiment illustrated in the drawings, in which.

Figure 1:
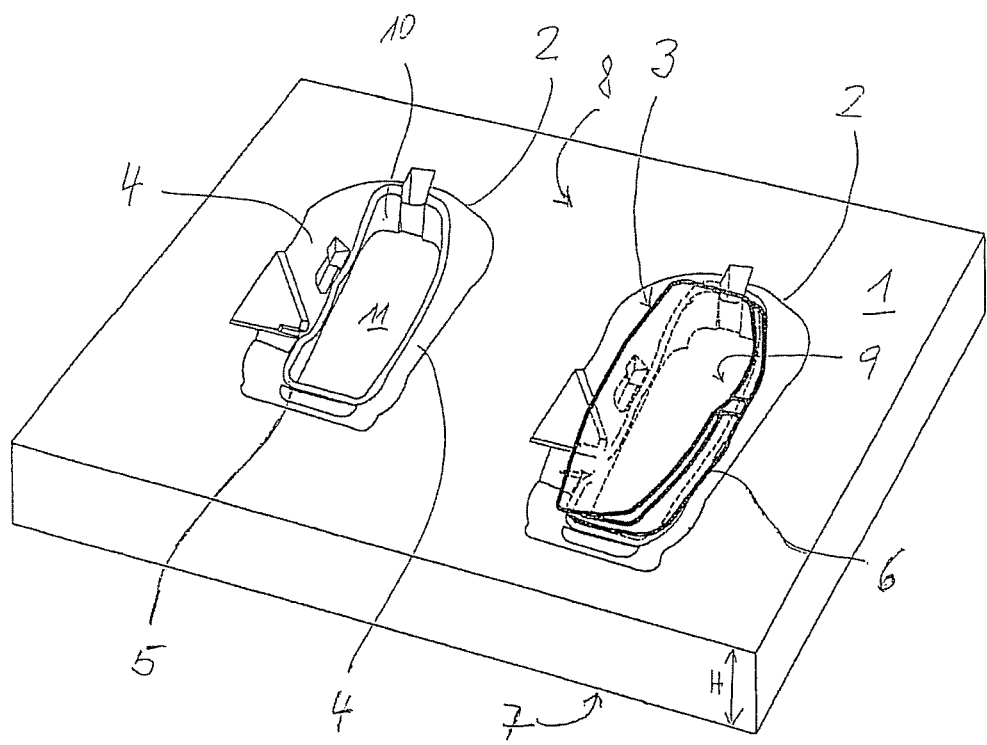
FIG. 1 is a schematic perspective representation of a plate serving as a holder, with two recesses, into one of which a component is inserted.

FIG. 1 shows a plate 1 comprising two recesses 2 for receiving a component 3. The plate has a given height H. The recesses 2 are formed at lateral margins with bevels 4, which develop at the lower margin into a step-like, peripheral bearing face 5, wherein the bearing face 5 has a profiled height contour, which is adapted to the shape of a lower edge 6 of the component 3. With the bevels 4 and the bearing face 5, the recess 2 thus forms profiling 4, 5 adapted to the component 3.

The plate 1 is oriented substantially horizontally, but may form an acute angle preferably of less than 20° with the horizontal in order to receive the component 3 securely and hold it fixed owing to the weight of the component 3.

The plate 1 comprises a bottom 7 as first side and a top 8 as second side. In the exemplary embodiment shown, the component 3 is placed onto the top 8 in such a way that it arches out towards the top 8, such that an exterior 9 of the component 3 projects at the top 8.

The bearing face 5 is delimited by a steep edge 10 of the recess 2, which defines a passage opening 11 of the recess 2 towards the bottom 7. The passage opening 11 is thus open towards the bottom 7. An interior 12 (FIG. 3) of the component 3 may thus be coated with a spray jet through the passage opening.

The bevels 4 are configured such that the entire exterior 9 of the component 3 may be coated with a spray jet from the top 8 of the plate 1. The spray jet may here be directed from a spray nozzle of a spray robot arm (not shown) onto the component 3 from all sides. The bevels 4 and optionally an edge falling steeply towards the bearing face 5 have the effect that a strip 13 of the exterior 9 adjoining the lower edge 6 of the component 3 remains uncoated, because the spray jet of the spray robot arm is directed such that the strip 13 always remains in the spray shadow of the bevel 4 and the step optionally formed towards the bearing face 5.

The component 3 may in this case be coated on its exterior 9 with a spray jet from the top 8 of the plate 1, while the interior 12 of the arched component 3 may be coated with the spray jet from the bottom of the plate 1.

Figure 2:
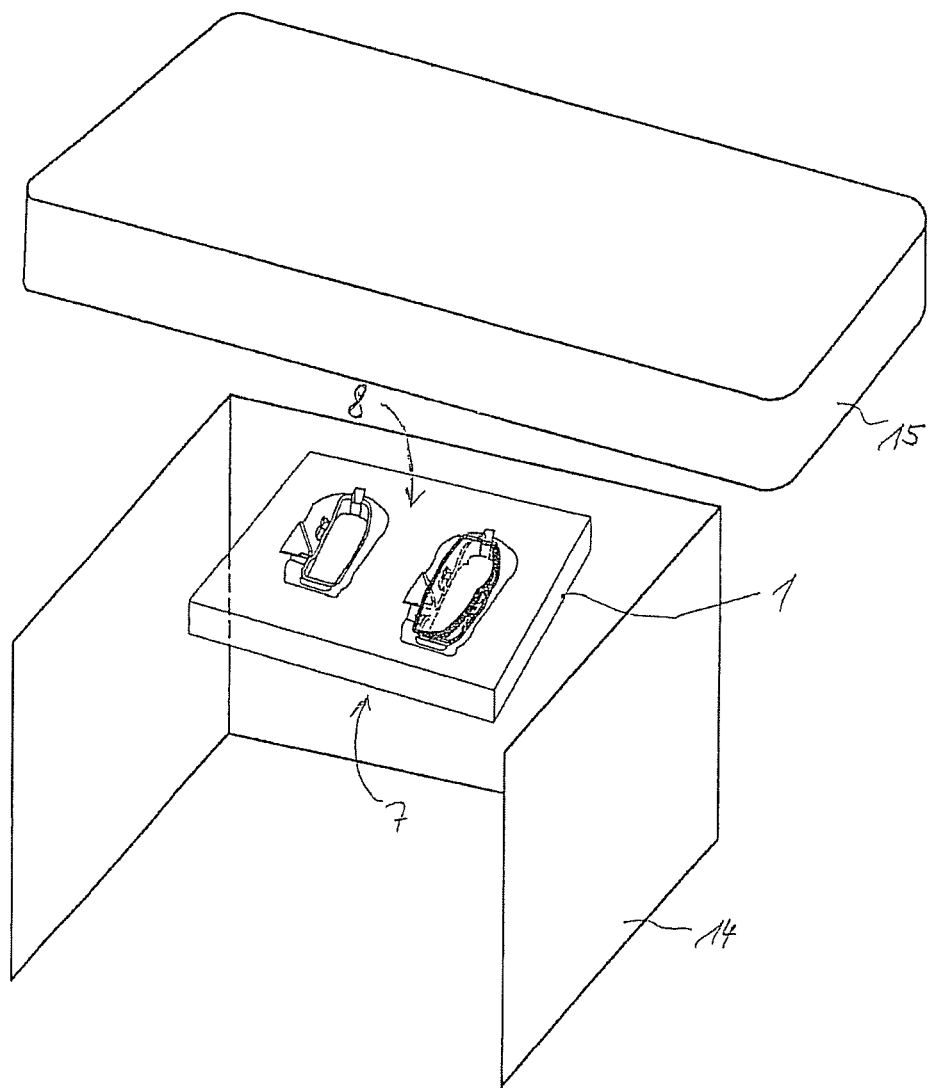
FIG. 2 shows an arrangement for carrying out the method using the plate according to FIG. 1.

FIG. 2 is a schematic illustration of a coating installation, with which the interior 12 is coated with a first coating material from the bottom 7 of the plate 1, the spray robot arm then being moved to the top 8 so as immediately thereafter to coat the exterior 9 of the component 3 with a second coating material.

During coating from the bottom 7 with the first coating material, the overspray is extracted by an extraction device (not shown) located under the plate 1. Extraction is assisted by a partition wall arrangement 14, which delimits the extraction chamber at the back and sides. In conventional clean room technology, purge air is conducted by a roof arrangement 15 onto the top of the plate 1 and passed around the plate 1, such that it may be extracted from the bottom 7. During the process of spraying onto the bottom 7 overspray is immediately extracted downwards, while during the process of spraying onto the top 8 with the second coating material the spray particles are guided around the plate 1 and extracted at the bottom 7 of the plate 1, such that these particles also cannot come into contact with the interior 12 of the component 3.

Contamination of the interior 12 with the second coating material or of the exterior 9 of the component 3 with the first coating material would have the consequence of disrupting subsequent coating of the other side, because the coating materials are incompatible, and therefore a homogeneous coating with the desired properties would not be obtained.

Figure 3:
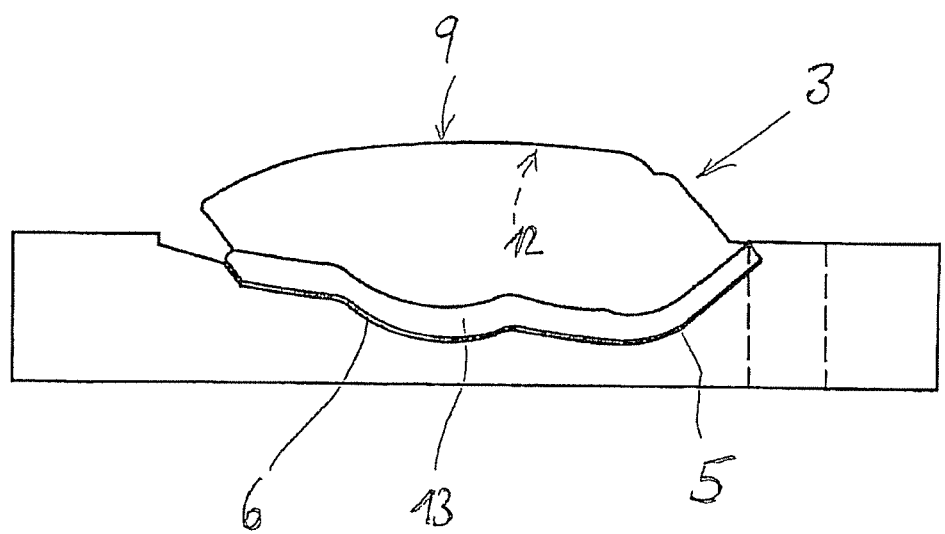
FIG. 3 shows a section in the longitudinal direction of the recess in the plate with a component inserted into the recess.

FIG. 3 also shows that the bearing face 5 is adapted in contour to the profile of the lower edge 6 of the component 3, such that sealing is achieved by placing the component 3 onto the bearing face 5. Any gap remaining between the lower edge 6 and the bearing face 5 would not result in spraying through, because the gap is located in the spray shadow of the bearing face 5 when coating of the interior 12 proceeds from the bottom 7 of the plate 1 and because on the exterior 9 the strip 13 is located in the spray shadow of the profiling 4, 5 and therefore remains uncoated. Since it is not possible to spray through a small, hypothetical gap, passage of coating particles as a result of air guidance and extraction is not possible. Reliable coating both of the interior 12 and of the exterior 9 with the different coating materials is therefore ensured, despite the component 3 merely being laid on the bearing face 5 of the recess 2.

Figure 4:
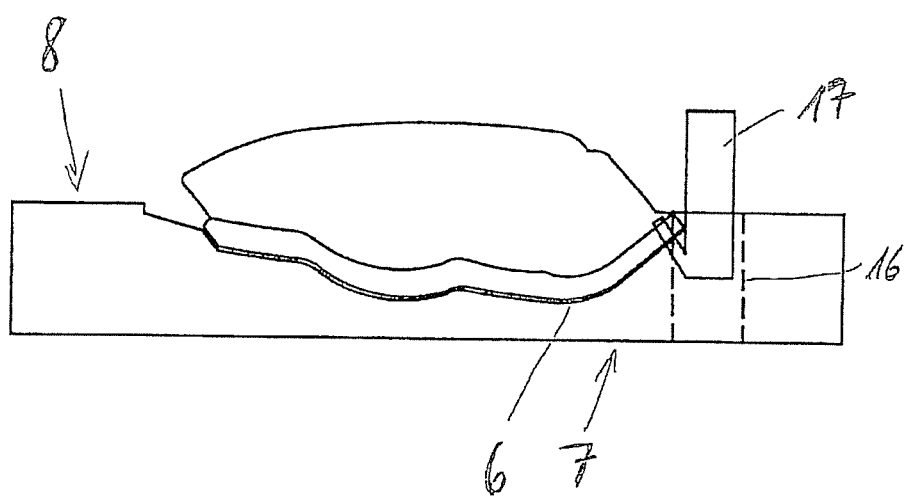
FIG. 4 is a representation according to FIG. 3 with a handling element for grasping the component.

FIGS. 3 and 4 show an insertion channel 16 at an end face of the component 3, which channel is sealed towards the bottom 7, for example by an inserted sheet metal part. A gripping element 17 may be introduced into the insertion channel 16, in order to grip the lower edge of the component 3 from below at the end face and thereby to lift the component 3 out of the recess 2 and for example place it on a belt which conveys the component 3 through a curing oven to cure the coatings. Alternatively, the component 3 may also be conveyed through a UV curing installation.

Placing the component 3 onto the recess 2 in the plate 1 in accordance with the invention, in conjunction with the air guidance known from clean room technology, enables reliable and trouble-free coating of the interior 12 and of the exterior 9 with different, mutually incompatible coating materials, mobile fastening means and/or a second part of a holder being dispensed with.

This enables very streamlined, reliable manufacture with extremely low handling effort.

The invention claimed is:

1. A method for coating a molded component comprising an interior and an exterior with a first coating material on the interior and with a second coating material on the exterior, wherein a strip at least of the exterior remaining uncoated in a region of a peripheral edge adjoining the interior and the exterior, and wherein the first and the second coating materials not being miscible with one another, comprising:
   introducing the molded component into a holder and holding said molded component fixed in position while the first and second coating materials are applied in succession by means of a spray robot,
      wherein a plate is used as the holder which comprises a recess with profiling formed over a height of the holder,
      wherein the component is inserted into the recess without the use of a mobile fastening means and thereby seals the recess in such a way that the first coating material sprayed on from a first side of the plate does not reach the exterior of the component and the second coating material sprayed on from the second side of the plate does not reach the interior of the component, and that any overspray from the first or second sides is extracted, and
      wherein spraying on of the second coating material proceeds in such a way that the strip of the component is always located in a spray shadow formed by the profiling.

2. The method as claimed in claim 1, wherein a spray arm of the spray robot comprises two lines and spray nozzles with which the first coating material and the second coating material are applied.

3. The method as claimed in claim 1, wherein the plate is oriented substantially horizontally, and
   wherein the first coating material is sprayed onto the component from a bottom as the first side of the plate and the second coating material is sprayed onto the component from a top as the second side of the plate.

4. The method as claimed in claim 1, wherein the component is optically transparent and wherein the first and second coating materials are used to form optically transparent coatings.

5. The method as claimed in claim 1, wherein the component is transparent to radiation from a source covered by the component and wherein the first and second coating materials form coatings transparent to radiation.

6. The method as claimed in claim 1, wherein the first coating material is an anti-fog coating material.

7. The method as claimed in claim 1, wherein the second coating material is a hard coat coating material.

\* \* \* \* \*